(12) United States Patent
Han et al.

(10) Patent No.: US 8,968,904 B2
(45) Date of Patent: Mar. 3, 2015

(54) SECONDARY BATTERY MODULE

(75) Inventors: Taeyoung Han, Bloomfield Hills, MI (US); Kuo-Huey Chen, Troy, MI (US); Bahram Khalighi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 12/754,234

(22) Filed: Apr. 5, 2010

(65) Prior Publication Data

US 2011/0244295 A1   Oct. 6, 2011

(51) Int. Cl.
| | |
|---|---|
| H01M 10/50 | (2006.01) |
| H01M 2/10 | (2006.01) |
| H01M 10/615 | (2014.01) |
| H01M 10/617 | (2014.01) |
| H01M 10/625 | (2014.01) |
| H01M 10/647 | (2014.01) |
| H01M 10/6566 | (2014.01) |
| H01M 10/6567 | (2014.01) |

(52) U.S. Cl.
CPC ........ H01M 2/1072 (2013.01); H01M 10/5006 (2013.01); H01M 10/5008 (2013.01); H01M 10/5016 (2013.01); H01M 10/5032 (2013.01); H01M 10/5073 (2013.01); H01M 10/5075 (2013.01)
USPC ........................................... 429/120; 429/72

(58) Field of Classification Search
USPC .................................... 429/62, 120
See application file for complete search history.

(56) References Cited

U.S. PATENT DOCUMENTS

| | | | |
|---|---|---|---|
| 5,392,873 | A | 2/1995 | Masuyama et al. |
| 6,261,710 | B1 | 7/2001 | Marianowski |
| 6,498,406 | B1 * | 12/2002 | Horiuchi et al. ............. 307/150 |
| 6,503,653 | B2 | 1/2003 | Rock |
| 6,512,347 | B1 | 1/2003 | Hellmann et al. |
| 6,569,556 | B2 | 5/2003 | Zhou et al. |
| 6,662,891 | B2 | 12/2003 | Misu et al. |
| 7,348,086 | B2 | 3/2008 | Iwai et al. |
| 7,348,094 | B2 | 3/2008 | Thompson et al. |

(Continued)

FOREIGN PATENT DOCUMENTS

JP        2007172983 A      7/2007

OTHER PUBLICATIONS

Office Actions for U.S. Appl. No. 11/232,712 mailed Oct. 29, 2007, Jul. 2, 2007 and Feb. 23, 2007.

(Continued)

*Primary Examiner* — Ula C. Ruddock
*Assistant Examiner* — Osei Amponsah
(74) *Attorney, Agent, or Firm* — Quinn Law Group, PLLC

(57) ABSTRACT

A secondary battery module includes a plurality of secondary battery cells each having a measureable temperature and each spaced apart from an adjacent one of the cells to define a cooling channel therebetween. The plurality of cells includes a first one of the cells having a measureable first temperature, and a terminal one of the cells having a measureable terminal temperature and separated from the first one of the cells by at least one other of the cells. The module includes a fluid flowable within each of the cooling channels and in thermal energy exchange relationship with each of the cells. The module includes a housing having a surface defining an inlet channel disposed in fluid flow communication with each of the cooling channels and configured for directing the fluid flow to each of the cooling channels. The surface has a shape defined by a spline.

11 Claims, 2 Drawing Sheets

(56) References Cited

U.S. PATENT DOCUMENTS

| | | | |
|---|---|---|---|
| 7,560,190 B2* | 7/2009 | Ahn et al. | 429/120 |
| 2002/0098414 A1* | 7/2002 | Ovshinsky et al. | 429/223 |
| 2003/0224239 A1 | 12/2003 | Carlstrom | |
| 2005/0153184 A1 | 7/2005 | Beutel et al. | |
| 2006/0093901 A1* | 5/2006 | Lee et al. | 429/120 |
| 2007/0031728 A1* | 2/2007 | Lee et al. | 429/120 |
| 2008/0171268 A1* | 7/2008 | Yazami | 429/341 |
| 2008/0182499 A1 | 7/2008 | He et al. | |
| 2009/0311586 A1* | 12/2009 | Chung et al. | 429/120 |

OTHER PUBLICATIONS

Office Actions for U.S. Appl. No. 10/755,128 mailed Aug. 12, 2009, Feb. 12, 2008, Oct. 2, 2007, Apr. 12, 2007, Jan. 26, 2007, Aug. 9, 2006, May 18, 2006, Feb. 23, 2006, Aug. 30, 2005 and May 16, 2005.
Office Action for U.S. Appl. No. 09/978,901 mailed Mar. 14, 2002.
Office Action for U.S. Appl. No. 11/668,154 mailed Sep. 15, 2009.
http://en.wikipedia.org/wiki/Bezier_curve.
Office Action for U.S. Appl. No. 09/771,058 mailed Sep. 25, 2002.
http://en.wikipedia.org/wiki/Spline_(mathematics).

* cited by examiner

SECONDARY BATTERY MODULE

TECHNICAL FIELD

The present invention generally relates to secondary battery modules, and more specifically, to secondary battery modules including a surface having a shape defined by a spline.

BACKGROUND OF THE INVENTION

Batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles. For example, secondary batteries for vehicle applications may be recharged external to the vehicle via a plug-in electrical outlet, or onboard the vehicle via a regenerative event.

A secondary battery, which may also be known as a secondary battery pack, may include one or more secondary battery modules. Similarly, a secondary battery module may include one or more secondary battery cells positioned adjacent to each other, e.g., stacked. When such secondary batteries are charged or discharged, heat is produced within the secondary battery module. If uncontrolled, such heat can detrimentally impact the life and performance of the secondary battery module and individual secondary battery cells. In particular, heat may contribute to secondary battery cell mismatch, i.e., a reduced state of health for one secondary battery cell as compared to other secondary battery cells.

SUMMARY OF THE INVENTION

A secondary battery module includes a plurality of secondary battery cells each having a measureable temperature and each spaced apart from an adjacent one of the secondary battery cells to define a cooling channel therebetween. The plurality of secondary battery cells includes a first one of the secondary battery cells having a measureable first temperature, and a terminal one of the secondary battery cells having a measureable terminal temperature and separated from the first one of the secondary battery cells by at least one other of the secondary battery cells. The secondary battery module also includes a fluid flowable within each of the cooling channels and in thermal energy exchange relationship with each of the secondary battery cells. Additionally, the secondary battery module includes a housing having a surface defining an inlet channel disposed in fluid flow communication with each of the cooling channels and configured for directing the fluid flow to each of the cooling channels. The surface has a shape defined by a spline.

In another variation, the surface has a shape defined by a Bézier curve of degree n according to an equation $B(t)=\Sigma_{i=0}^{n}\binom{n}{i}(1-t)^{n-i}t^{i}P_{i}=(1-t)^{n}P_{0}+\binom{n}{1}(1-t)^{n-1}tP_{1}+\ldots+t^{n}P_{n}$, where $0 \leq t \leq 1$ and $P_0, P_1, \ldots P_n$ are control points on said surface.

In yet another variation, the surface has a shape defined by a cubic Bézier curve according to the equation $B(t)=(1-t)^3 P_0 + 3t(1-t)^2 P_1 + 3t^2(1-t)P_2 + t^3 P_3$, where $0 \leq t \leq 1$ and $P_0, P_1, P_2$, and $P_3$ are control points on the surface.

The secondary battery modules provide excellent temperature control for secondary batteries. That is, fluid flow across the cooling channels is substantially uniform, and therefore the secondary battery modules have substantially uniform temperature distributions across a length of the secondary battery modules. In particular, the surface defining the inlet channel minimizes non-uniform cooling of the secondary battery module by providing substantially uniform flow distribution across the cooling channels along the secondary battery module during operation. Further, the substantially uniform temperature distribution minimizes cell mismatch between individual secondary battery cells during operation. Additionally, the secondary battery modules provide excellent cooling without the use of flow control baffles and/or guiding vanes, require comparatively less packaging volume because of the shape of the surface, and are therefore economical to produce. Finally, since the secondary battery modules allow for air cooling, the secondary battery modules are versatile and useful for applications requiring minimized mass and weight. The secondary battery modules have excellent performance and longevity.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
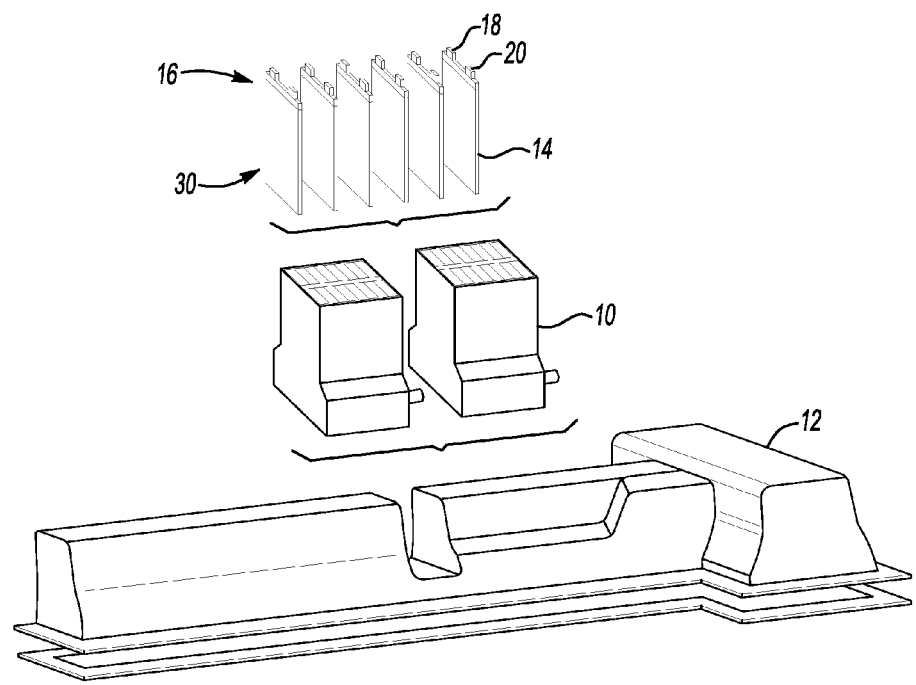
FIG. 1 is an exploded schematic perspective view of a secondary battery and components thereof, including a plurality of secondary battery cells and a plurality of secondary battery modules.

Referring to the Figures, wherein like reference numerals refer to like elements, a secondary battery module is shown generally at 10 in FIG. 1. The secondary battery module 10 may be useful for a variety of applications requiring rechargeable battery power, such as, but not limited to, electronic devices, tools, machinery, and vehicles. For example, the secondary battery module 10 may be useful for electric and hybrid electric vehicles. However, it is to be appreciated that the secondary battery module 10 may also be useful for non-automotive applications, such as, but not limited to, household and industrial power tools and electronic devices.

Referring to FIG. 1, the secondary battery module 10 may be useful for a plug-in hybrid electric vehicle (PHEV) (not shown). For example, the secondary battery module 10 may be a lithium ion secondary battery module 10. Referring again to FIG. 1, a plurality of battery modules 10 may be combined to form a secondary battery 12, i.e., a secondary battery pack. By way of example, the secondary battery module 10 may be sufficiently sized to provide a necessary voltage for powering a hybrid electric vehicle (HEV), an electric vehicle (EV), a plug-in hybrid electric vehicle (PHEV), and the like, e.g., approximately 300 to 400 volts or more, depending on the required application.

Referring again to FIG. 1, the secondary battery module 10 includes a plurality of secondary battery cells 14 positioned adjacent one another. The secondary battery cells 14 may be any suitable electrochemical battery cell. For example, the secondary battery cells 14 may be lithium ion, lithium ion polymer, lithium iron phosphate, lithium vanadium pentoxide, lithium copper chloride, lithium manganese dioxide, lithium sulfur, lithium titanate, nickel metal hydride, nickel cadmium, nickel hydrogen, nickel iron, sodium sulfur, vanadium redox, lead acid, and combinations thereof.

Figure 2:
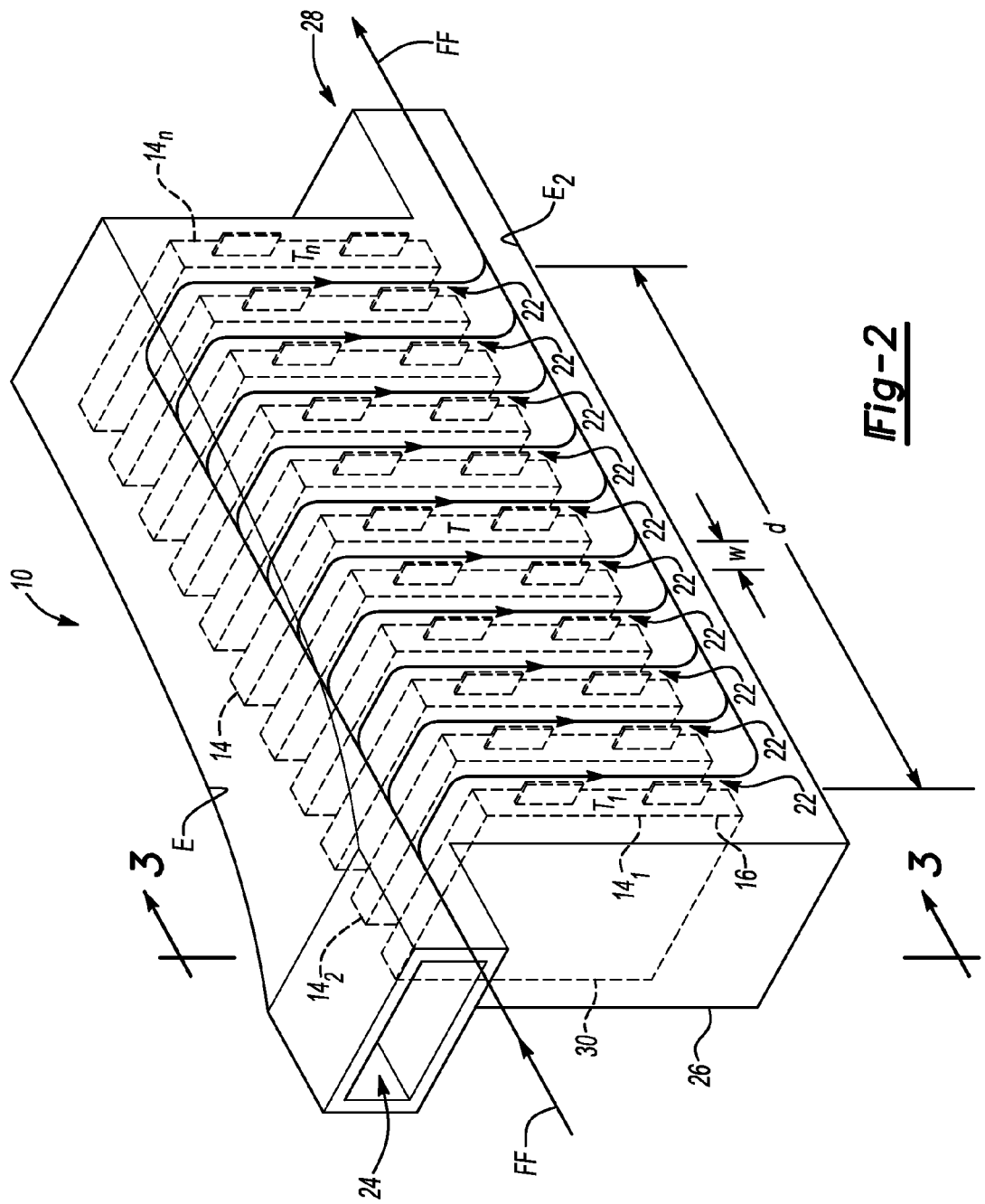
FIG. 2 is a schematic perspective view of the secondary battery module of FIG. 1.

Referring now to FIGS. 1 and 2, each secondary battery cell 14 may have a first end 16 including positive cell tab 18 and a negative cell tab 20. The secondary battery cell 14 may be suitable for stacking. That is, the secondary battery cell 14 may be formed from a heat-sealable, flexible foil that is sealed to enclose a cathode, an anode, and a separator (not shown). Therefore, any number of secondary battery cells 14 may be stacked or otherwise placed adjacent to each other to form a cell stack, i.e., the secondary battery module 10. Further, although not shown, additional layers, such as, but not limited to, frames and/or cooling layers may also be positioned in the space between individual secondary battery cells 14. The actual number of secondary battery cells 14 may be expected to vary with the required voltage output of each secondary battery module 10. Likewise, the number of interconnected secondary battery modules 10 may vary to produce the necessary total output voltage for a specific application.

During operation, a chemical redox reaction may transfer electrons from a region of relatively negative potential to a region of relatively positive potential to thereby cycle, i.e., charge and discharge, the secondary battery cells 14 and the secondary battery module 10 to provide voltage to power applications requiring the secondary battery 12.

Referring to FIG. 2, during operation of the secondary battery module 10, each secondary battery cell 14 has a measureable temperature, T. More specifically, the plurality of secondary battery cells 14 includes a first one of the secondary battery cells $14_1$ having a measureable first temperature, $T_1$, and a terminal one of the secondary battery cells $14_n$ having a measureable terminal temperature, $T_n$. The terminal one of the secondary battery cells $14_n$ is separated from the first one of the secondary battery cells $14_1$ by at least one other of the secondary battery cells $14_2$. That is, the secondary battery module 10 includes at least three secondary battery cells 14. However, the secondary battery module 10 may include any suitable number of secondary battery cells 14, e.g., from about 3 to about 100 secondary battery cells 14.

Further, the secondary battery cells 14 may be connected in series to provide the desired voltage of the secondary battery module 10 and/or secondary battery 12 (FIG. 1). A distance, d, between the first one of the secondary battery cells $14_1$ and the terminal one of the secondary battery cells $14_n$ may be from about 0.5 m to about 2 m.

Additionally, referring again to FIG. 2, each secondary battery cell 14 is spaced apart from an adjacent one of the secondary battery cells 14 to define a cooling channel 22 therebetween. That is, one cooling channel 22 may be sandwiched between two adjacent secondary battery cells $14_1$, $14_2$. Further, each of the cooling channels 22 may have a width, w, of from about 0.5 mm to about 1.5 mm.

Referring to FIG. 2, the secondary battery module 10 also includes a fluid (designated by fluid flow arrows FF in FIG. 2) flowable within each of the cooling channels 22. For example, the fluid flow (arrows FF) may be contained by the cooling channels 22 and have a sufficient viscosity for flowing through the cooling channels 22. The fluid flow (arrows FF) is in thermal energy exchange relationship with each of the secondary battery cells 14. Stated differently, the fluid flow (arrows FF) is capable of changing the measureable temperature, T, of each of the secondary battery cells 14. That is, during operation, the fluid flow (arrows FF) may have a temperature that is lower than the measureable temperature, T, of the respective secondary battery cells 14 so as to cool the secondary battery cells 14, as set forth in more detail below.

The fluid flow (arrows FF) may be a gas, such as air, a liquid, such as a hydrocarbon refrigerant, or combinations thereof, such as a carbonated liquid. Air is a suitable fluid (arrows FF) of the secondary battery module 10.

Figure 3:
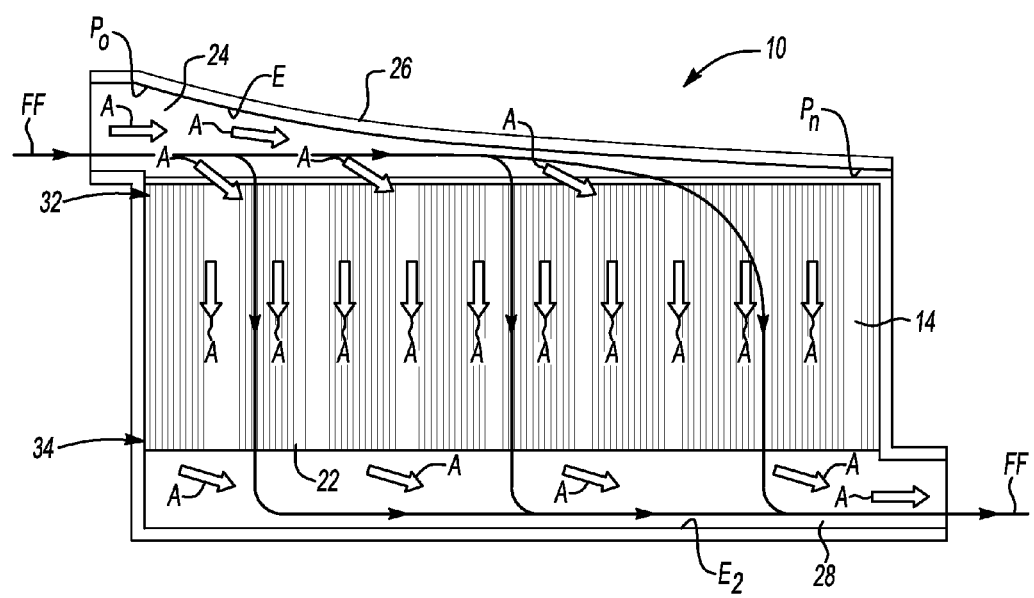
FIG. 3 is a schematic sectional view of the secondary battery module of FIG. 2 along section line 3-3.

Referring now to FIGS. 2 and 3, each secondary battery module 10 also includes a housing 26 having a surface E defining an inlet channel 24 disposed in fluid flow communication with each of the cooling channels 22 and configured for directing the fluid flow (arrows FF) to each of the cooling channels 22. That is, the inlet channel 24 may convey the fluid flow (arrows FF) from a fluid source, e.g., ambient air surrounding the secondary battery module 10, to each of the cooling channels 22. As such, the inlet channel 24 may function as an inlet manifold.

Referring to FIGS. 2 and 3, the surface E has a shape defined by a spline. As used herein, the terminology "spline" refers to a piecewise polynomial function. That is, a spline may defined piecewise by a plurality of polynomials. For example, the spline may include a curve, such as, but not limited to, a Bézier curve. The spline may be any suitable spline, and the spline may be multivariate or univariate. Further, the spline may be uniform or non-uniform. For example, the spline may be selected from the group including, but not limited to, Bézier splines, cubic splines, Hermite splines, cardinal splines, Catmull-Rom splines, Kochanek-Bartels splines, B-splines, nonuniform rational B-spline (NURBS), and combinations thereof. Also, the spline may include curves defined by polynomials of any suitable order n, such as cubic polynomials, i.e., n=3, and quadratic polynomials, i.e., n=4. For example, the surface E may have the shape defined by a cubic spline.

By way of a non-limiting example, the spline of degree n may be generally defined according to equation (1) for an extended knot vector t:

$$t=(t_0,t_1,\ldots,t_1,t_2,\ldots,t_2,t_3,\ldots,t_{k-2},t_{k-1},\ldots,t_{k-1},\ldots,t_{k-1},t_k) \quad (1)$$

where $t_i$ is a neighborhood for i=1, ..., k−1 and is repeated $j_i$ times, $j_i$=n−$r_i$, and r is a smoothness vector equal to ($r_i$, ..., $r_{k-1}$) such that the spline has at least a smoothness $C^{r_i}$ at neighborhood as set forth in more detail below.

That is, the spline is a function, S, having values from an interval [a,b] mapped to real numbers, R, according to a relationship (2):

$$S:[a,b] \to R \quad (2)$$

S may be piecewise defined so that the interval [a,b] is covered by k ordered, disjoint subintervals [$t_i$, $t_{i+1}$], where i=0, ..., k−1 so that $$[a,b]=[t_0,t_1]\cup[t_1,t_2]\cup\ldots\cup[t_{k-2},t_{k-1}]\cup[t_{k-1},t_k] \quad (3)$$

and $$a=t_0 \leq t_1 \leq \ldots \leq t_{k-1} \leq t_k=b. \quad (4)$$

A polynomial, $X_i$, is defined on each of the k subintervals of [a,b] according to a relationship (5):

$$X_i:[t_i,t_{i+1}] \to R \quad (5)$$

Therefore, on the ith subinterval of [a,b], the spline S is defined by $X_i$ according to relationships (6)-(8):

$$S(t) = X_0(t), t_0 \leq t < t_1 \quad (6)$$

$$S(t) = X_1(t), t_1 \leq t < t_2 \quad (7)$$

...

$$S(t) = X_{k-1}(t), t_{k-1} \leq t < t_k \quad (8)$$

where points $t_i$ are knots and a knot vector for the spline is defined by relationship (9):

$$t = (t_0, \ldots, t_k) \quad (9)$$

In one variation, the surface E has a shape defined by a Bézier curve of degree n according to equation (10):

$$B(t) = \Sigma_{i=0}^{n} \binom{n}{i}(1-t)^{n-i}t^i P_i = (1-t)^n P_0 + \binom{n}{1}(1-t)^{n-1}tP_1 + \ldots + t^n P_n \quad (10)$$

where $0 \leq t \leq 1$ and $P_0, P_1, \ldots P_n$ are control points on the surface E. That is, given control points $P_0, P_1, \ldots P_n$, the Bézier curve begins at control point $P_0$, ends at control point $P_n$, and is a path traced by the function B(t) specified by equation (10).

In another variation, the surface E has the shape defined by a cubic Bézier curve according to equation (11):

$$B(t) = (1-t)^3 P_0 + 3t(1-t)^2 P_1 + 3t^2(1-t) P_2 + t^3 P_3 \quad (11)$$

where $0 \leq t \leq 1$ and $P_0, P_1, P_2$, and $P_3$ are control points on the surface E. That is, in this variation, the Bézier curve starts at control point $P_0$, continues toward control point $P_1$, and arrives at control point $P_3$ coming from control point $P_2$.

In yet another variation, the surface E has the shape defined by a quadratic Bézier curve according to equation (12):

$$B(t) = (1-t)^2 P_0 + 2t(1-t) P_1 + t^2 P_2 \quad (12)$$

where $0 \leq t \leq 1$ and $P_0, P_1, P_2$ are control points on the surface E. In this variation, the Bézier curve is a path traced by the function B(t) specified by equation (12), given control points $P_0$, $P_1$, and $P_2$.

As shown in FIG. 3, the surface E having the shape defined by the spline, e.g., the cubic spline and/or the Bézier curve, may be spaced opposite and apart from each of the secondary battery cells 14. For example, the inlet channel 24 may be disposed along a first side 32 of each individual secondary battery cell 14 so as not to contact each first side 32, and direct fluid flow (arrows FF) across each of the first sides 32 in a direction of arrows A in FIG. 3.

Referring again to FIGS. 2 and 3, the housing 26 of the secondary battery module 10 may further define an outlet channel 28 disposed in fluid flow communication with each of the cooling channels 22 and configured for directing the fluid flow (arrows FF) away from each of the cooling channels 22. That is, the outlet channel 28 may function as an outlet manifold. The outlet channel 28 may convey the fluid flow (arrows FF) from each of the cooling channels 22 to exhaust the fluid flow (arrows FF) from, and/or recirculate the fluid flow (arrows FF) throughout, the secondary battery module 10. Further, the outlet channel 28 may be spaced opposite and apart from the inlet channel 24.

The housing 26 may also have an additional surface $E_2$ defining the outlet channel 28, wherein the additional surface $E_2$ also has a shape defined by a spline, e.g., a cubic spline or a Bézier curve. That is, although not shown in FIGS. 2 and 3, the outlet channel 28 may have the same or different shape than the inlet channel 24.

As shown in FIGS. 2 and 3, each of the secondary battery cells 14 may be disposed between the outlet channel 28 and the surface E defining the inlet channel 24. For example, in contrast to the inlet channel 24 that may be disposed at the first side 32 of each of the secondary battery cells 14, the outlet channel 28 may be disposed at a second side 34 (FIG. 3) spaced opposite from the first side 32 of each of the secondary battery cells 14. Therefore, the plurality of secondary battery cells 14 may be disposed between the inlet channel 24 and the outlet channel 28 so that the cooling channels 22 are in fluid flow communication with both the inlet and outlet channels 24, 28.

Therefore, in operation and described with reference to FIG. 3, the inlet channel 24 directs the fluid flow (arrows FF) to each of the cooling channels 22 disposed between individual secondary battery cells 14. The fluid flow (arrows FF) may be passively or actively circulated into the inlet channel 24. For example, the fluid flow (arrows FF) may drift into the inlet channel 24 or may be blown into the inlet channel 24 by a fan.

Referring again to FIG. 2, the surface E defining the inlet channel 24 and having the shape defined by the spline, e.g., the cubic spline and/or the Bézier curve, ensures that the fluid flow (arrows FF) is distributed to each of the cooling channels 22 so that a flow rate of the fluid (arrows FF) across the first one of the secondary battery cells $14_1$ is substantially equal to a flow rate of the fluid (arrows FF) across the terminal one of the secondary battery cells $14_n$ during operation of the secondary battery module 10. That is, during operation, the surface E having the shape defined by the spline provides a controlled flow path so that the flow rate of the fluid (arrows FF) does not substantially diminish along a length of the secondary battery module 10 between the first one of the secondary battery cells $14_1$ and the terminal one of the secondary battery cells $14_n$. In addition to the controlled flow path, the surface E having the shape defined by the spline also provides a substantially uniform fluid flow distribution across the secondary battery module 10 so that each cooling channel 22 experiences a substantially equal fluid flow rate.

Stated differently, each of the cooling channels 22 has a skin friction coefficient, $C_f$, of less than or equal to about 0.15. And, since the flow rate of the fluid (arrows FF) across the first one of the secondary battery cells $14_1$ is substantially equal to the flow rate across the terminal one of the secondary battery cells $14_n$ during operation of the secondary battery module 10, each of the cooling channels 22 has a substantially equal skin friction coefficient, $C_f$. As used herein, the terminology "skin friction coefficient" is defined as a shearing stress exerted by the fluid flow (arrows FF) on a surface of the cooling channel 22 over which the fluid flow (arrows FF) flows. That is, the skin friction coefficient, $C_f$, refers to a dimensionless value of a measurement of the friction of the fluid flow (arrows FF) against a "skin" of the cooling channel 22, i.e., a fluid/cooling channel interface. Skin friction arises from an interaction between the fluid flow (arrows FF) and the skin of the cooling channel 22 and is related to an area of the cooling channel 22 that is in contact with the fluid flow (arrows FF).

Therefore, in operation, and with continued reference to FIGS. 2 and 3, as the fluid flow (arrows FF) flows through each cooling channel 22, the fluid flow (arrows FF) is in thermal energy exchange relationship with each secondary battery cell 14 of the secondary battery module 10. That is, thermal energy, i.e., heat, generated during the charge and/or discharge of each secondary battery cell 14 may be transferred to the fluid flow (arrows FF) to thereby dissipate thermal energy from each secondary battery cell 14. Consequently, as the fluid flow (arrows FF) flows through the inlet channel 24 during operation of the secondary battery module 10 and impinges the surface E having the shape defined by the spline, e.g., the cubic spline and/or the Bézier curve, the fluid flow (arrows FF) is directed through each cooling channel 22 at a substantially equal flow rate so that the fluid flow (arrows FF) may dissipate thermal energy from each secondary battery cell 14 and thereby cool each secondary battery cell 14. For variations including the additional surface (not shown) of the housing 26 defining the outlet channel 28, having the shape defined by the spline, the fluid flow (arrows FF) exits each cooling channel 22 so as not to disturb the substantially equal flow rate.

The measureable terminal temperature, $T_n$, of the terminal one of the secondary battery cells $14_n$ may be different than the measureable first temperature, $T_1$, of the first one of the secondary battery cells $14_1$. However, during operation, a difference, $\Delta T_{1-n}$, between the measureable first temperature, $T_1$, of the first one of the secondary battery cells $14_1$ and the measureable terminal temperature, $T_n$, of the terminal one of the secondary battery cells $14_n$ may be less than or equal to about 5° C. during operation of the secondary battery module 10. Stated differently, the secondary battery module 10 has a substantially uniform measureable temperature, T, between secondary battery cells 14. Moreover, the measureable temperature, T, of each of the secondary battery cells 14 may be from about 25° C. to about 40° C., e.g., from about 25° C. to about 35° C., during operation of the secondary battery module 10. That is, the measureable temperature, T, across the secondary battery cells 14 may not vary by more than about 2° C. so that the secondary battery 12 (FIG. 1) including multiple secondary battery cells 14 may operate within the temperature range of from about 25° C. to about 40° C. during operation. Therefore, the surface E defining the inlet channel 24 and having the shape defined by the spline, e.g., the cubic spline and/or the Bézier curve, provides excellent cooling and substantially uniform temperature distribution across the secondary battery cells 14 and thereby minimizes uneven temperature distribution within the secondary battery module 10.

The secondary battery modules 10 provide excellent temperature control for secondary batteries 12. That is, fluid flow (arrows FF) across the cooling channels 22 is substantially uniform, and therefore the secondary battery modules 10 have substantially uniform temperature distributions across a length of the secondary battery modules 10. In particular, the surface E defining the inlet channel 24 minimizes non-uniform cooling of the secondary battery module 10 by providing substantially uniform flow distribution across the cooling channels 22 along the secondary battery module 10 during operation. Further, the substantially uniform temperature distribution minimizes cell mismatch between individual secondary battery cells 14 during operation. Since each secondary battery cell 14 may be connected to other secondary battery cells 14 in series, performance of the secondary battery module 10 is maximized since no one secondary battery cell $14_1$ is weaker than any other secondary battery cell $14_n$ when power is withdrawn from the secondary battery module 10 during operation. Therefore, the secondary battery modules 10 have excellent performance and longevity. Additionally, the secondary battery modules 10 provide excellent cooling without the use of flow control baffles and/or guiding vanes, require comparatively less packaging volume because of the shape of the surface E, and are therefore economical to produce. Finally, since the secondary battery modules 10 allow for air cooling, the secondary battery modules 10 are versatile and useful for applications requiring minimized mass and weight.

While the best modes for carrying out the invention have been described in detail, those familiar with the art to which this invention relates will recognize various alternative designs and embodiments for practicing the invention within the scope of the appended claims.

The invention claimed is:

1. A secondary lithium ion battery module comprising:
a plurality of secondary battery cells each having a measureable temperature and each spaced apart from an adjacent one of said secondary battery cells to define a cooling channel therebetween, wherein said plurality of secondary battery cells includes a first one of said secondary battery cells having a measureable first temperature, and a terminal one of said secondary battery cells having a measureable terminal temperature and separated from said first one of said secondary battery cells by at least one other of said secondary battery cells;
a fluid flowable within each of said cooling channels and in thermal energy exchange relationship with each of said secondary battery cells; and
a housing having a surface defining an inlet channel disposed in fluid flow communication with each of said cooling channels, wherein said surface has a plurality of control points and a shape defined by a spline such that said surface directs said fluid flow to each of said cooling channels during operation of the secondary lithium ion battery module so that a flow rate of said fluid across said first of said secondary battery cells is substantially equal to a flow rate of said fluid across said terminal of said secondary battery cells;
wherein said spline is defined piecewise by a plurality of polynomials each having an order of greater than or equal to 3 to thereby form a smooth curve that passes through each of said plurality of control points;
wherein the secondary lithium ion battery module is free from any flow control baffles disposed between adjacent ones of the plurality of secondary battery cells that are configured to direct said fluid to said plurality of secondary battery cells.

2. The secondary lithium ion battery module of claim 1, wherein said measureable terminal temperature is different than said measureable first temperature and the difference between said measureable first temperature and said measureable terminal temperature is less than or equal to about 5° C. during operation of the secondary lithium ion battery module.

3. The secondary lithium ion battery module of claim 1, wherein said surface is spaced opposite and apart from each of said secondary battery cells.

4. The secondary lithium ion battery module of claim 1, wherein said housing further defines an outlet channel disposed in fluid flow communication with each of said cooling channels and configured for directing said fluid flow away from each of said cooling channels.

5. The secondary lithium ion battery module of claim 4, wherein each of said secondary battery cells is disposed between said outlet channel and said surface of said inlet channel.

6. The secondary lithium ion battery module of claim 1, wherein a distance between said first one of said secondary battery cells and said terminal one of said secondary battery cells is from about 0.5 m to about 2 m.

7. The secondary lithium ion battery module of claim 6, wherein said measureable terminal temperature is different than said measureable first temperature and the difference between said measureable first temperature and said measureable terminal temperature is less than or equal to about 5° C. during operation of the secondary lithium ion battery module.

8. The secondary lithium ion battery module of claim 1, wherein said measureable temperature of each of said secondary battery cells is from about 25° C. to about 40° C. during operation of the secondary lithium ion battery module.

9. The secondary lithium ion battery module of claim 1, wherein each of said cooling channels has a skin friction coefficient, $C_f$, of less than or equal to about 0.15.

10. The secondary lithium ion battery module of claim 1, wherein each of said cooling channels has a width of from about 0.5 mm to about 1.5 mm.

11. The secondary lithium ion battery module of claim 1, wherein said spline is a cubic spline.

\* \* \* \* \*